United States Patent [19]

Shimoura et al.

[11] 4,244,389
[45] Jan. 13, 1981

[54] FLOW CONTROL VALVE

[75] Inventors: Yoshiyuki Shimoura, Higashimatsuyama; Asaji Kuroda, Kawagoe, both of Japan

[73] Assignee: Jidoshakiki Co., Ltd., Tokyo, Japan

[21] Appl. No.: 27,240

[22] Filed: Apr. 5, 1979

[30] Foreign Application Priority Data

Sep. 8, 1978 [JP] Japan .............................. 53-110457
Jan. 22, 1979 [JP] Japan .................................. 54-6385

[51] Int. Cl.³ .......................................... G05D 11/03
[52] U.S. Cl. ..................................... 137/117; 251/120
[58] Field of Search ................. 137/101, 117; 251/120

[56] References Cited

U.S. PATENT DOCUMENTS

| 1,726,795 | 9/1929 | Ball | 251/120 |
|---|---|---|---|
| 2,485,349 | 10/1949 | Barr | 251/120 |
| 2,566,860 | 9/1951 | Segal | 251/120 |
| 3,314,495 | 4/1967 | Clark et al. | 137/117 |
| 3,320,968 | 5/1967 | Nuss | 137/117 |
| 3,410,295 | 11/1968 | Malott | 137/117 |
| 3,426,785 | 2/1969 | Brady et al. | 137/117 |
| 3,979,908 | 9/1976 | Alderson | 137/101 |
| 3,983,893 | 10/1976 | Nubson | 137/101 |

Primary Examiner—William R. Cline
Assistant Examiner—H. Jay Spiegel
Attorney, Agent, or Firm—Blanchard, Flynn, Thiel, Boutell & Tanis

[57] ABSTRACT

A flow control valve in which the hydraulic pressure difference exerted on a spool valve is controlled by regulating the degree of throttling of a variable orifice and the oil which is discharged from an oil pump is partly returned to the suction side of the oil pump in response to the degree of actuation of the spool valve according to the above hydraulic pressure difference, thereby controlling the quantity of oil that is fed to hydraulic devices. The flow passage to communicate the oil pump with the hydraulic devices includes a flow passage which permits the hydraulic oil to pass through a hole in which the spool valve is fitted, and a variable orifice is composed of an opening of the flow passage into the hole and a small diameter portion formed on the spool valve. The throttling of the variable orifice is attained by covering the opening with a predetermined clearance by the above small diameter portion.

7 Claims, 16 Drawing Figures

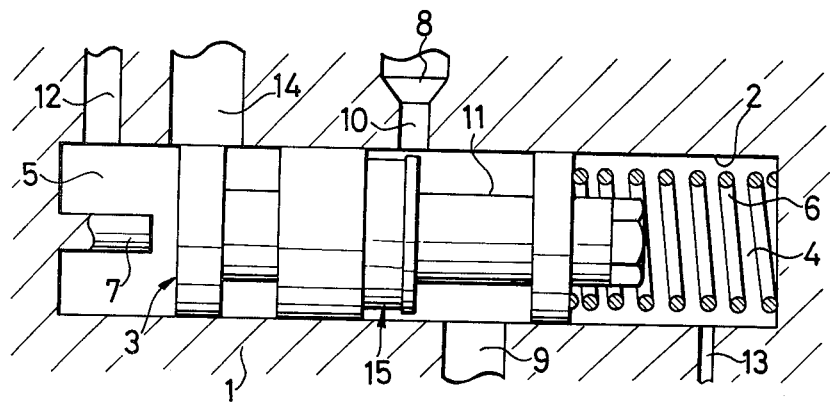
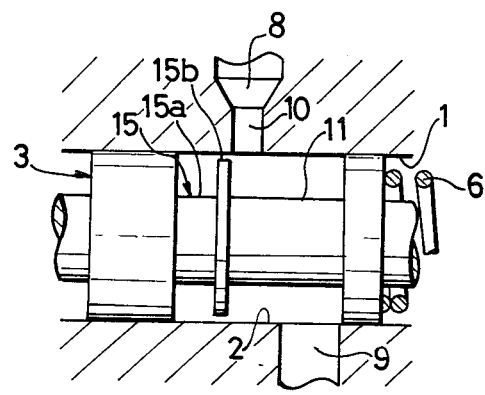
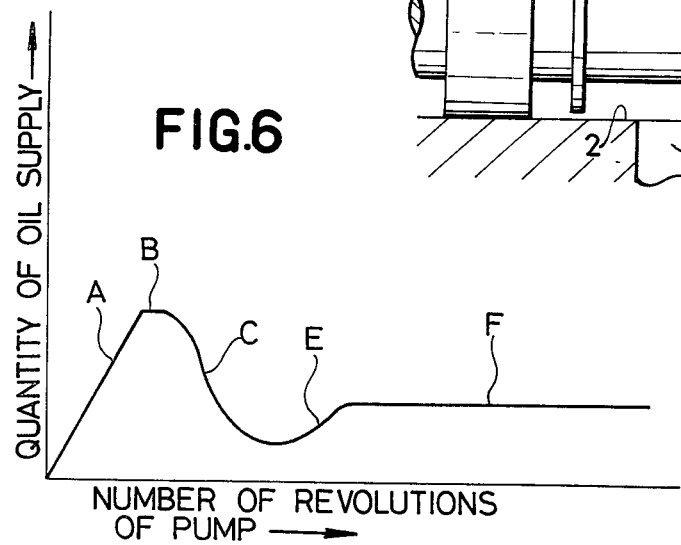

FLOW CONTROL VALVE

BACKGROUND OF THE INVENTION

The present invention relates to a flow control valve. More particularly, the invention relates to a flow control valve which is able to control the quantity of oil fed to hydraulic devices from an oil pump in response to the increase in the quantity of discharged oil from the oil pump.

There are hitherto known flow control valves which are so designed that, when the quantity of oil discharged from the oil pump is increased, the quantity of oil that is fed to the hydraulic device from the oil pump is decreased. The flow control valve of this kind is basically provided with an orifice disposed midway in a flow passage which communicates the delivery opening of the oil pump with the hydraulic device, and a spool valve which is actuated in response to the hydraulic pressure difference generated in front of and behind the orifice and returns the oil, in a quantity responsive to the degree of actuation thereof, from the flow passage to the suction port of the oil pump. With an increase of the hydraulic pressure difference, the quantity of oil which is fed to the hydraulic device is decreased.

A means for increasing such hydraulic pressure difference is exemplified by a device (as disclosed in U.S. Pat. No. 3,314,495) in which the aspirator effect due to the flow of fluid is utilized to reduce the oil pressure on the low pressure side so that the hydraulic pressure difference is increased and the quantity of the feed oil is decreased, and a device (as disclosed in U.S. Pat. No. 3,426,785) in which, separately from the above orifice, there is provided a variable orifice which is composed of a spool valve and an opening of a flow passage into a hole, said flow passage permitting the hydraulic oil to pass through the hole in which the spool valve is slidably fitted. So that the opening is gradually closed directly by the spool valve, thereby throttling the flow passage and increasing the hydraulic pressure difference.

The flow control valve having such a flow characteristic is commonly used for the power steering of a vehicle and serves to provide stability of the vehicle when it runs at high speeds and a proper sensitivity in steering. Incidentally, in the case that the flow control valve of this type as described above is applied to the power steering device of a vehicle, it is so designed that in order to supply minimal hydraulic oil even at high-speed running so as to assure smooth operation of the power steering device, the quantity of oil fed to the power steering device is reduced to a certain level and after that the quantity of oil supply is maintained constant to supply minimal hydraulic oil.

In the flow control valves of the conventional art, however, the quantity of oil supply that is controlled to a given minimal value as described above is gradually increased with an increase of the quantity of discharged oil of the oil pump, which is liable to give an adverse effect to the high speed stability of the vehicle. In addition, the shaping of machine parts to obtain various flow characteristics is difficult, and the freedom in setting the flow characteristics is small due to the difficulties in the shaping and the structure. Moreover, it is impossible for the prior art flow control valves to increase freely the quantity of oil which is fed to the hydraulic device with the increase in the quantity of discharged oil of the oil pump after the quantity of oil fed to the hydraulic device is once reduced.

BRIEF SUMMARY OF THE INVENTION

It is, therefore, an object of the present invention to provide a flow control valves which possesses a large freedom in the setting of flow characteristics. In the flow control valve of the invention, a spool valve is provided with a small diameter portion, and the small diameter portion and the opening of a flow passage communicating with a hole in which the spool valve is fitted, constitute a variable orifice. The throttling of the flow passage by the variable orifice is achieved in a manner such that the opening is covered by the small diameter portion with a predetermined clearance. Accordingly, the above clearance is varied, and particularly, a stepped surface is formed in the small diameter portion so that the clearance adjacent the opening is varied by the relative position of the small diameter portion to vary the degree of the throttling, thereby enabling the setting of the flow characteristics freely.

Accordingly, another object of the present invention is to provide a flow control valve which is able to maintain the quantity of feed oil constant or to reduce it slightly even when the discharge rate of the oil pump is increased after the quantity of feed oil to the hydraulic device is reduced to a predetermined level.

It is a further object of the present invention to provide a flow control valve which is easy to shape as the result of the provision of the small diameter portion in the spool valve.

BRIEF DESCRIPTION OF THE DRAWINGS

Further features of the invention will become more apparent from the following description taken in connection with the accompanying drawings, in which:

FIG. 5 is a longitudinal cross-sectional view of the main portion of the same showing a state different from that shown in FIG. 4;

FIG. 6 is a characteristic curve obtained by the flow control valve shown in FIGS. 4 and 5;

FIGS. 7, 9, 11, 13 and 15 are respectively cross-sectional views of the main parts of still other embodiments in accordance with the present invention.

DESCRIPTION OF PREFERRED EMBODIMENTS

Figure 1:
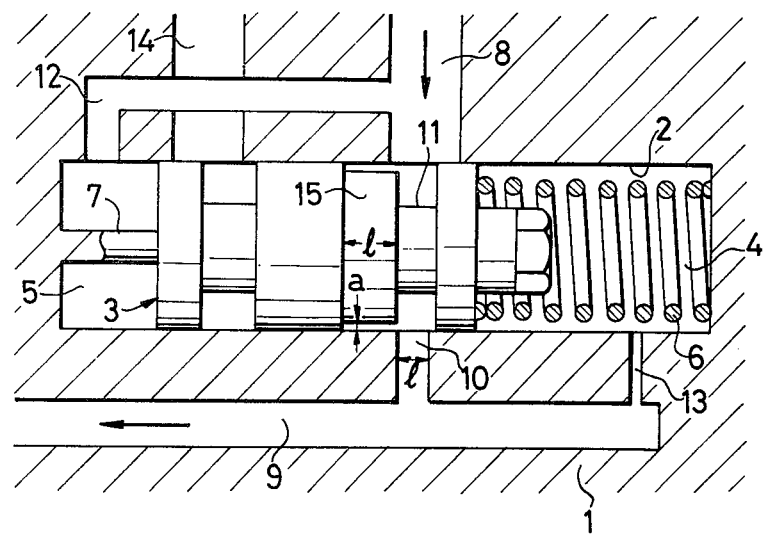
FIG. 1 is a longitudinal cross-sectional view of an embodiment of the present invention.

Referring now to FIG. 1, the present invention will be described in detail. The housing 1 of a flow control valve is formed with a hole 2, in which a spool valve 3 is slidably fitted to define a low pressure chamber 4 at one side thereof and a high pressure chamber 5 at the other side thereof. The spool valve 3 is pushed by the force of a spring 6 that is retained within the low pressure chamber 4 so as to normally hold the valve 3 in the illustrated position (FIG. 1) in contact with a stopper 7 which is positioned within the high pressure chamber 5. The housing 1 has an inlet port 8 which is connected to the delivery port of an oil pump (not shown), and an outlet port 9 which is connected to a power steering device (not shown). The inlet port 8 is directly opened to a predetermined point of the hole 2 and the outlet port 9 is also opened to a predetermined point of the hole 2 through an orifice port 10. The inlet port 8 and the orifice port 10 are brought into communication with each other through an annular groove 11 which is formed in the outer peripheral surface of the spool valve 3 so that the oil discharged from the oil pump can be supplied to the power steering device through the inlet port 8, the annular groove 11, the orifice port 10 and the outlet port 9. The housing 1 is further provided with a passage 12 to communicate the inlet port 8 with the high pressure chamber 5 and a passage 13 to communicate the outlet port 9 with the low pressure chamber 4. Thus, the passage 12 is capable of introducing the oil pressure on the upstream side of the orifice port 10 into the high pressure chamber 5 and the passage 13 introduces the oil pressure on the downstream side of the orifice port 10 into the low pressure chamber 4.

The housing 1 is further provided with a bypass port 14 whose one end is in communication with the suction side of the oil pump while the other end is opened into the hole 2. The opening of the port 14 into the hole 2 is closed by the outer peripheral surface of the spool valve 3 when the valve 3 is held in the illustrated position (FIG. 1), but it is communicated with the high pressure chamber 5 when the spool valve 3 is shifted rightward (FIG. 2) by the hydraulic pressure difference that is caused between the high pressure chamber 5 and the low pressure chamber 4 as will be described later, and it passes a part of the discharged oil from the oil pump towards the suction side of the oil pump.

Further, the spool valve 3 has a small diameter portion 15 which adjoins the annular groove 11. The small diameter portion 15 has a diameter slightly smaller than the inner diameter of the hole 2 to leave a small clearance a between the outer peripheral surface of the small diameter portion 15 and the inner surface of the hole 2, and when the spool valve 3 is located in the illustrated position (FIG. 1), the small diameter portion 15 does not cover up the opening of the orifice port 10. The small diameter portion 15 has an axial dimension l which is made larger than the dimension l' of the orifice port 10 as measured in the same direction.

Figure 3:
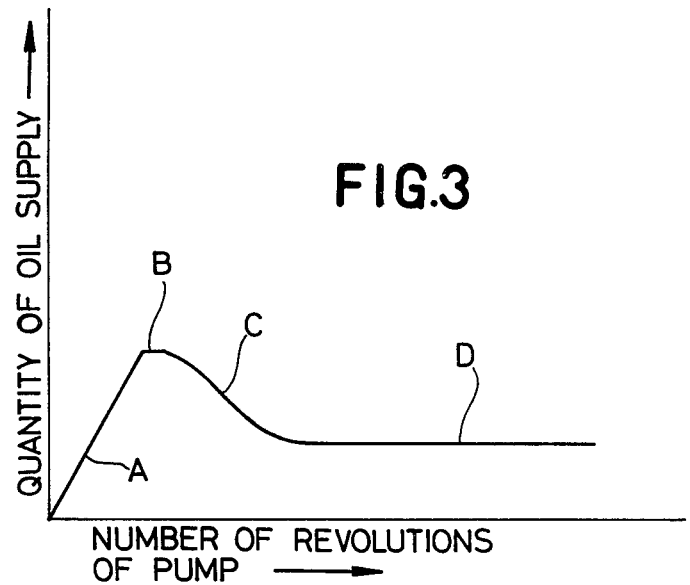
FIG. 3 is a characteristic curve obtained by the flow control valve shown in FIGS. 1 and 2.

With the arrangement as described above, when the rate of discharge of the oil pump is small, the discharged oil from the oil pump is fed into the power steering device through the inlet port 8, the annular groove 11, the orifice port 10 and the outlet port 9. Since the quantity of oil discharged from the oil pump is generally in proportion to the number of revolutions of the oil pump, the relationship between the quantity of oil fed to the power steering device and the number of revolutions of the oil pump is given by the straight line A in FIG. 3.

When the quantity of oil discharged from the oil pump is increased, a pressure difference is produced by the throttling action of the orifice port 10 and, therefore, the oil pressure on the upstream side or the high pressure side of the orifice port 10 is introduced into the high pressure chamber 5 through the passage 12, while the oil pressure on the downstream side or the low pressure side of the orifice port 10 is introduced into the low pressure chamber 4 through the passage 13, and consequently, the working force caused by the pressure difference is exerted upon the spool valve 3. When the working force exceeds the force of the spring 6, the spool valve 3 is actuated against the spring 6 to bring the high pressure chamber 5 into communication with the bypass port 14. As a result, the hydraulic oil discharged from the oil pump is partly returned to a suction port of the oil pump through the passage 12, the high pressure chamber 5 and the bypass port 14, and in addition, this quantity of returned oil, in other words, the passage area between the high pressure chamber 5 and the bypass port 14 is controlled by the displacement of the spool valve 3 that is actuated in response to the hydraulic pressure difference between the sides in front of and behind the orifice port 10. For this reason, even if the quantity of discharged oil is increased as the result of increase in the number of revolutions of the oil pump, the quantity of oil that is fed to hydraulic devices can be maintained constant (see FIG. 3, straight line B).

Figure 2:
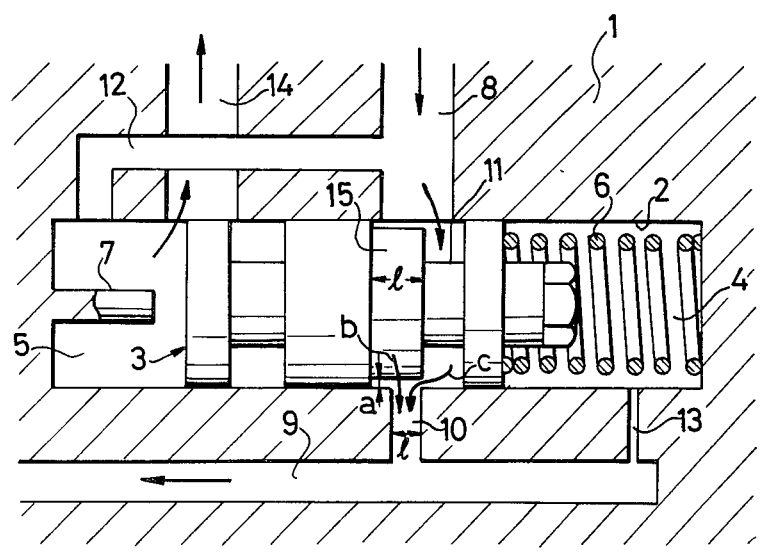
FIG. 2 is a longitudinal cross-sectional view of the same showing a state different from that shown in FIG. 1.

At the same time, with the rightward shift of the spool valve 3, the small diameter portion 15 of the spool valve 3 covers the opening of the orifice port 10 with a given clearance a as may be understood from FIG. 2, thereby increasing the throttling action in the orifice portion. As a consequence, the hydraulic pressure difference in front of and behind the orifice portion increases to increase the quantity of returning oil while decreasing the quantity of oil that is fed to the power steering device (see FIG. 3, curve C). When the spool valve 3 is further advanced rightward as the result of the increase in the discharge rate of the oil pump and the small diameter portion 15 substantially covers up the opening of the orifice port 10 as shown in FIG. 2, the quantity of oil that is fed to the power steering device remains substantially constant thereafter for the reason similar to that for the aforementioned straight line B (see FIG. 3 straight line D).

Incidentally, in conventional flow control valves, it is a general practice that the above-described curve C has been obtained by the variable throttling device of a variable orifice mechanism, and the above-described straight line D has been obtained in a most throttled state, that is, in a state similar to a fixed orifice. However, even if an attempt was made to obtain the straight line D, that is, a given quantity of oil supply, the quantity of oil supply was actually increased with the increase in the quantity of discharged oil of the oil pump. In the present embodiment, however, when the spool valve 3 is further moved rightward from the position shown in FIG. 2, the hydraulic oil (see the arrow b in FIG. 2) flowing into the orifice port 10 through the clearance a is not affected by the above rightward movement, but the hydraulic oil (see the arrow c in FIG. 2) flowing into the orifice port 10 from the annular groove 11 through the clearance a receives gradually larger resistance as the spool valve 3 is moved rightward. Accordingly, the throttling effect in the orifice portion slightly increases, as a consequence, it becomes possible to maintain the quantity of oil that is fed to the power steering device substantially constant or to reduce it gradually.

Figure 4:
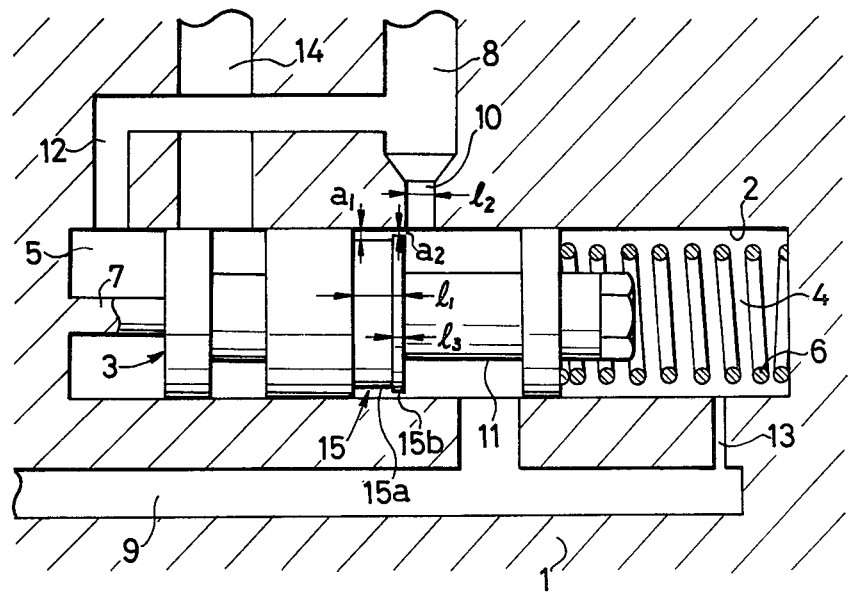
FIG. 4 is a longitudinal cross-sectional view of another embodiment of the present invention.

Next, another embodiment of the present invention is shown in FIG. 4. While in the above-described embodiment, the diameter of the small diameter portion 15 is set constant along the axial direction thereof, a small diameter portion 15 in the embodiment shown in FIG. 4 is provided with a body portion 15a and a large-diameter protruded annular portion 15b which is formed at one end of the body portion 15a. Both the portions 15a and 15b have their diameters which are set smaller than the inner diameter of the hole 2, thereby forming the small clearances $a_1$ and $a_2$, respectively, between the portions 15a and 15b and the hole 2. Further, when the spool valve 3 is located in the illustrated position, the small diameter portion 15 does not cover the opening of the orifice port 10 and the small diameter portion 15 has an axial dimension $l_1$ which is set larger than the dimension $l_2$ of the orifice port 10, whereas the protruded annular portion 15b has an axial dimension $l_3$ which is set smaller than the dimension $l_2$ of the orifice port 10. In addition, while in the former embodiment, the orifice port 10 is positioned on the side of the outlet port 9, while the orifice port 10 in this second embodiment is positioned on the side of the inlet port 8. Other structures of the second embodiment are not different from those of the first embodiment, and the parts in the second embodiment corresponding to those in the first embodiment are indicated by the same reference numerals.

In the flow control valve in this embodiment, when the spool valve 3 is moved rightward and the protruded annular portion 15b covers the opening of the orifice port 10, the throttling action in the orifice portion thereof is increased to reduce the quantity of oil which is fed to a hydraulic device. The operation so far described is not essentially different from that achieved by the former embodiment and the characteristic curve thereof is indicated by the straight lines A and B, and the curve C in FIG. 6.

When the spool valve 3 is further moved rightward as the result of an increase in the discharge quantity of the oil pump and the small diameter body portion 15a following the protruded annular portion 15b, approaches the opening of the orifice port 10 (see FIG. 5), the throttling rate is increased by the protruded annular portion 15b, and at the same time, the throttling rate is decreased by the body portion 15a. Therefore, the throttling rate as the whole is shifted from the increase to the decrease with the rightward movement of the spool valve 3 in excess of a given level. During this time, the throttling action itself increases with the increase of the discharge quantity of the oil pump, but the rate of increase of the throttling action varies from large to small as the aforementioned throttling rate is changed from the increase to the decrease. Consequently, the quantity of oil which is fed to hydraulic devices is varied from the decrease to the increase (see FIG. 6, curve E).

When the spool valve 3 is further moved rightward so that the protruded annular portion 15b is moved beyond the opening of the orifice port 10, the rate of increase in the throttling action becomes substantially constant, and after that, the quantity of oil that is fed to the hydraulic devices becomes substantially constant (see FIG. 6, straight line F) for the reason similar to that for the aforementioned straight line B.

Figure 8:
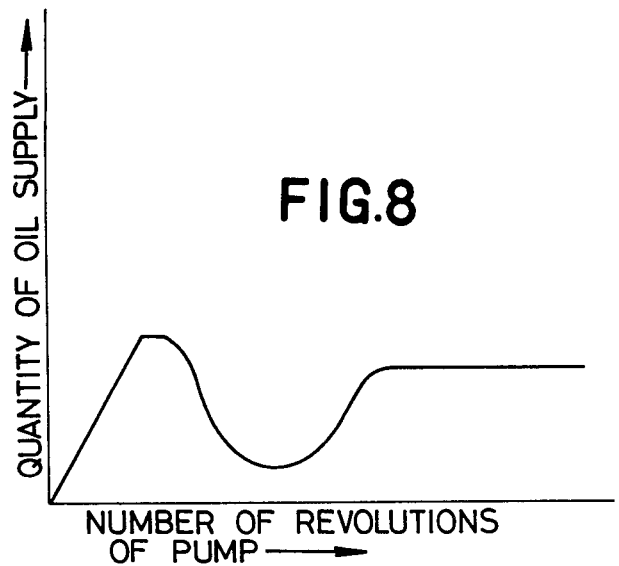
FIGS. 8, 10, 12, 14 and 16 are characteristic curves obtained by the flow control valves shown in FIGS. 7, 9, 11, 13 and 15, respectively.

As may be obvious from these two embodiments as described above, the configuration of the small diameter portion 15 has a significant influence on the flow characteristics. It is, therefore, possible to select the flow characteristics freely by varying the configuration of the small diameter portion 15 properly. For example, even in the second embodiment, it is possible to vary the flow characteristics by setting the axial dimension $l_3$ of the protruded annular portion 15b to the size substantially identical to or larger than the dimension $l_2$ of the orifice port 10 or by changing the value of the above clearances $a_1$ and $a_2$. In the embodiment shown in FIG. 7, the diameter of the body portion 15a of the small diameter portion 15 is made substantially the same as that of the annular groove 11, that is, the opening of the orifice port 10 is not substantially throttled at the body portion 15a. In this flow characteristics as shown in FIG. 8, the flow rate which corresponds to the straight line F of FIG. 6 becomes large.

Figure 9:
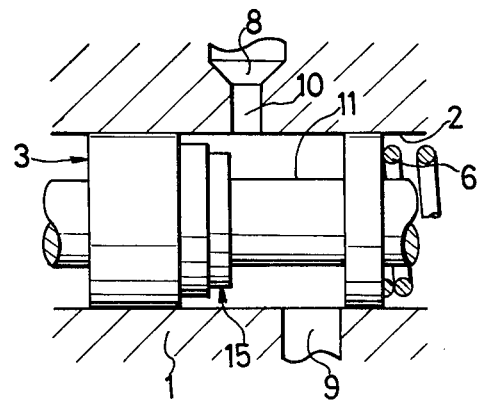
Figure 10:
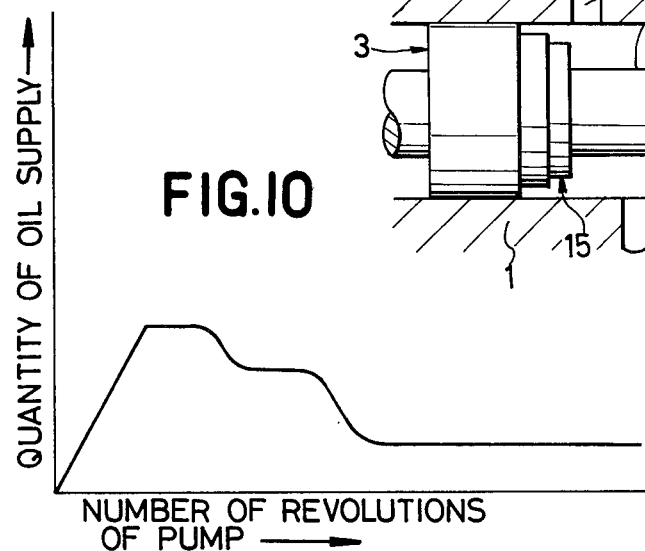
Figure 11:
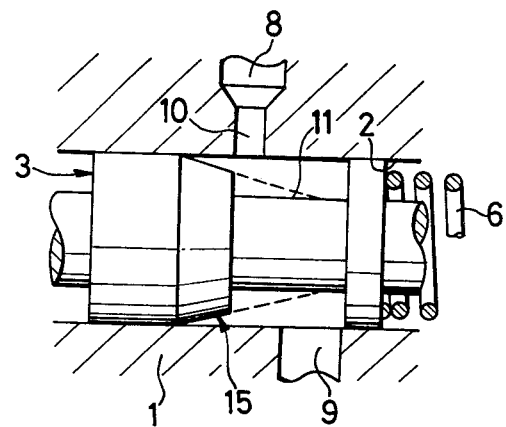
Figure 12:
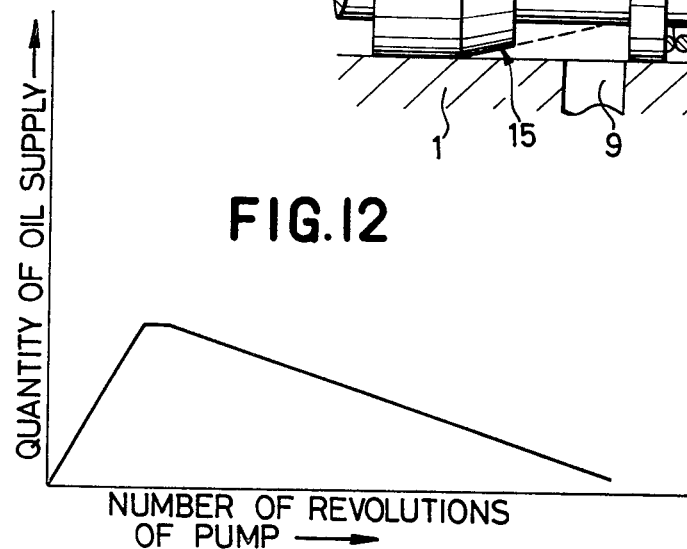
Figure 13:
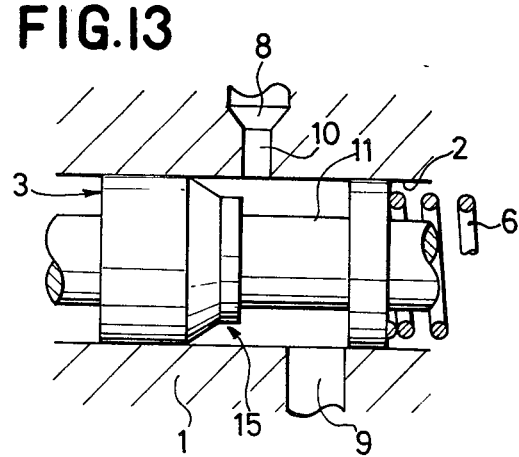
Figure 14:
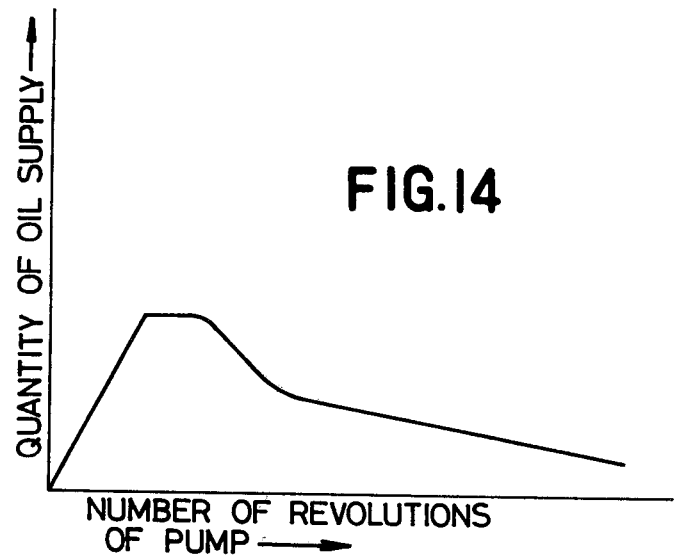
Figure 15:
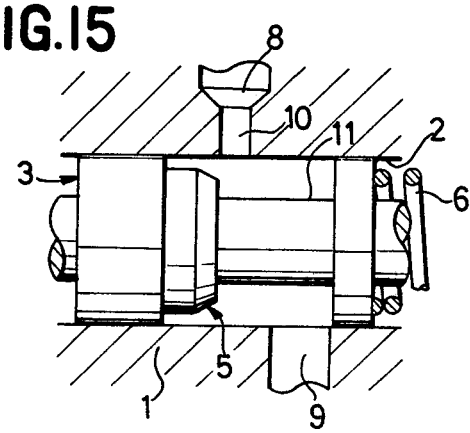
Figure 16:
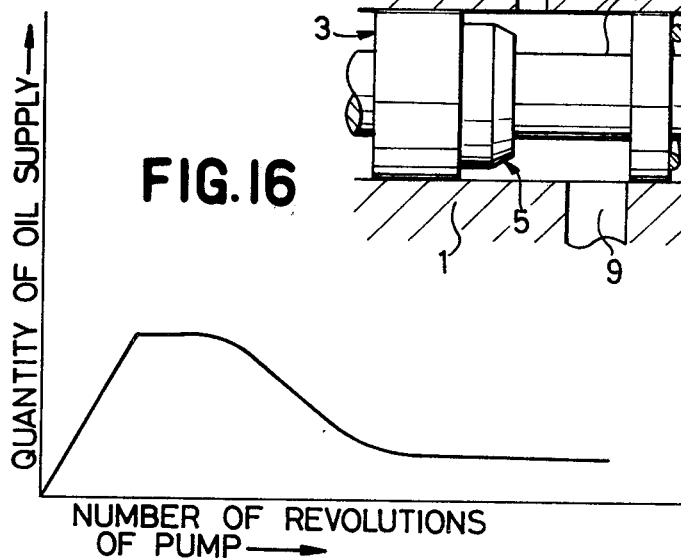

Alternative configurations of the small diameter portion 15 that may be employed include a two-stage cylindrical surface (FIG. 9) with the forward portion, that is, in the side from the non-operative position to the operative position of the spool valve 3 being formed into a small diameter, or a conical surface (FIG. 11) shown by the solid lines or dotted lines with the forward end converged, or the configurations (FIGS. 13 and 15) with both the cylindrical surface and the conical surface. It will be apparent that the flow characteristics as shown in FIGS. 10, 12, 14 and 16 may be obtained, respectively, by the small diameter portion 15 of condifurations shown in FIGS. 9, 11, 13 and 15. It is also possible to obtain a variety of flow characteristics by forming the small diameter portion into a spherical surface or by combining the cylindrical surface or conical surface with the spherical surface. It will be noted that in the case that the spool valve 3 is provided with a detent means, the small diameter portion may be formed circumferentially and partly with uneven surfaces as previously mentioned.

Although the present invention has been described in connection with preferred embodiments thereof, many variations and modifications will now become apparent to those skilled in the art. It is preferred, therefore, that the present invention be limited not by the specific disclosure herein but only by the appended claims.

What is claimed is:

1. A flow control valve, comprising: a housing having an elongated hole therein, an inlet port extending laterally from said hole between the longitudinal ends thereof and adapted to be connected to a supply of pressure fluid, an outlet port extending laterally from said hole and adapted to be connected to a load device, said outlet port being located relative to said inlet port so that the pressure fluid can flow from said inlet port through said hole to said outlet port, said housing having a bypass port extending laterally from said hole and adapted to be connected to return pressure fluid to said supply, said bypass port being longitudinally offset from said inlet port and said outlet port, said housing having a first passage extending from said inlet port to one longitudinal end of said hole adjacent said bypass port and a second passage extending from said outlet port to the opposite longitudinal end of said hole; a spool valve slidably disposed in said hole for longitudinal movement therein, said spool valve having first, second and third valve lands slidably and sealingly engaging the wall of said hole, said first valve land being disposed between said first passage and said bypass port and being movable across said bypass port to open or close same, said third valve land being disposed between said inlet and outlet ports and said opposite longitudinal end of said hole, said second valve land being disposed between said bypass port and said inlet and outlet ports, said second valve land including a portion of reduced diameter spaced from the wall of said hole and adapted to be moved in said hole between said inlet and outlet ports to form a predetermined clearance defining a variable flow passage in said hole and extending between said inlet port and said outlet port when said valve spool is moved toward said opposite longitudinal end of said hole.

2. The flow control valve as claimed in claim 1, wherein said portion of reduced diameter is composed of a cylindrical surface having a uniform diameter.

3. The flow control valve as claimed in claim 1, wherein said portion of reduced diameter is provided with stepped surfaces or surfaces of non-uniform diameter which vary said clearance when said spool valve is moved toward said opposite longitudinal end of said hole.

4. The flow control valve as claimed in claim 3, wherein said portion of reduced diameter is provided with a plurality of cylindrical surfaces of different diameters.

5. The flow control valve as claimed in claim 3, wherein said portion of reduced diameter is provided with one or more conical surfaces.

6. The flow control valve as claimed in claim 5, wherein said portion of reduced diameter is provided with one or more cylindrical surfaces.

7. The flow control valve as claimed in claim 5 or claim 6, wherein the diameter of said conical surface progressively decreases in a direction toward said opposite longitudinal end of said hole.

* * * * *